United States Patent [19]

Shimizu et al.

[11] Patent Number: 4,680,058

[45] Date of Patent: Jul. 14, 1987

[54] WHITE INK COMPOSITION FOR INK-JET PRINTING

[75] Inventors: Ryuichi Shimizu, Hitachiota; Yasuki Mori, Hitachi; Tsuneaki Kawanishi, Hitachi; Osamu Isoo, Hitachi; Hirosada Morishita, Hitachi; Tooru Hosoda, Koshigaya, all of Japan

[73] Assignees: Hitachi, Ltd.; Dainichiseika Color & Chemicals MFG. Co., Ltd., both of Japan

[21] Appl. No.: 711,003

[22] Filed: Mar. 12, 1985

Related U.S. Application Data

[63] Continuation of Ser. No. 519,674, Aug. 2, 1983, abandoned.

[30] Foreign Application Priority Data

Aug. 4, 1982 [JP] Japan .................................. 57-135166

[51] Int. Cl.$^4$ ............................................. C09D 11/08
[52] U.S. Cl. ........................................ 106/23; 106/30;
106/308 M; 523/160
[58] Field of Search ...................... 106/23, 30, 308 M;
523/160; 524/77

[56] References Cited

U.S. PATENT DOCUMENTS

| | | | |
|---|---|---|---|
| 4,228,438 | 10/1980 | Vazirani | 346/1.1 |
| 4,365,035 | 12/1982 | Zabiak | 524/283 |
| 4,389,503 | 6/1983 | Maxwell et al. | 106/22 |

OTHER PUBLICATIONS

Derwent Abstract Accession No. 77-56110y/32, German Patent No. DE2704082, Aug. 4, 1977.
Derwent Abstract Accession No. 78-07021A/04, Japanese Patent No. J52146307, Dec. 6, 1977.
Derwent Abstract Accession No. 80-37347c/21, Japanese Patent No. J55050073, Apr. 11, 1980.

*Primary Examiner*—Amelia B. Yarbrough
*Attorney, Agent, or Firm*—Antonelli, Terry & Wands

[57] ABSTRACT

A dark or black print article is ink-jet printed with a white ink composition comprising at least a white pigment having a particle size of less than 3 μm, a solvent and a binder resin with a good print stability. The white ink composition has a good dispersion stability, a good redispersability, and no nozzle clogging.

33 Claims, 5 Drawing Figures

A: SEPARATED WHITE LAYER
B: SEPARATED CLEAR LAYER
C: INITIALLY CHARGED INK HEIGHT

WHITE LAYER PROPORTION (%) = $\frac{A}{C} \times 100$

WHITE INK COMPOSITION FOR INK-JET PRINTING

This is a continuation of application Ser. No. 519,674, filed Aug. 2, 1983, now abandoned

BACKGROUND OF THE INVENTION

This invention relates to an ink for use in ink-jet printing, and more particularly to a white ink composition suitable for ink-jet printing of colored articles or transparent articles made of particularly wood, metal, such as iron and steel in shapes of plates, tubes, etc., plastics, glass, porcelain, leather, surface-treated cardboard, etc. and to use of the white ink composion in ink-jet printing of colored articles, particularly black or dark articles.

Before printing of desired letters on a print article, the ink for use in the ink-jet printer is converted to fine particles, when injected from a nozzle, by vibration given to the nozzle, and the thus obtained fine ink particles are electrically charged according to electrical letter signals, and undergo deviation in direction according to the electrical charges during passage between deviation electrodes under a given potential. Thus, in the ink-jet printer, the ink must have such functions that the ink is stably converted to fine particles, and forms desired printing on an article according to an electrical letter signal. Thus, the basic requirements for such an ink composition for use at a temperature of 5° to 40° C. are as follows:

Viscosity: 1–15 cp
Surface tension: 20–60 dyn/cm
Specific resistance: less than 2,000 Ω.cm
Specific gravity: 1–3

Further, the ink must be stable and homogeneous for a prolonged time, and must be able to print an article with the necessarily sufficient precision and concentration and rapid drying without clogging the nozzle or filter.

Heretofore, an aqueous ink using water as the main dispersant and an organic ink using an organic solvent as the main dispersant have been available for ink-jet printing, and both inks use a dye as a coloring material soluble in the respective solvents, and are directed to printing white or similarly colored articles. When a print article is heavily colored, the print itself is hidden by the proper color of the print article, and cannot be recognized.

An ink for ink-jet printing, which is applicable to metal, glass, rubber, etc. and uses an organic solvent as the main component is disclosed, for example, in Japanese Patent Application Kokai (Laid-open) Nos. 46-54147, 49-50935, 52-96106, 52-138208 and 55-50073, and U.S. Pat. No. 4,248,636, where the coloring material is limited to black or colored dye, and thus is not applicable to printing of black or dark articles.

Printing of black or dark articles are well known in the technical field of paint and ink, where mainly white pigments having a high hiding power, such as titanium white is used as the coloring material. However, the paint generally has too high a viscosity, whereas the ink generally has such a low viscosity as to pass through a felt like a felt pen ink, and the pigment is liable to settle down when the ink is left standing for a prolonged time. In this case, no consideration is given to the specific resistance.

Recently, preparation of ink for ink-jet printing having the necessary requirements for conversion to fine particles according to electrical letter signals has been tried on the basis of the paint and ink [Wire Journal (April, 1980) pages 84–87]. However, the most difficult problem encountered in using an ink for ink-jet printing using, for example titanium oxide as a white pigment, is a long-term operation. Such printing has the following two problem areas:

(1) Maintaining uniform pigment dispersion and suspension in the ink, and (2) Elimination of pigment accumulation and blockage of system filters.

To solve the first problem area, continuous mechanical stirring of ink is necessary or a tube with a smaller diameter must be used in an ink feed system to increase an ink flow rate, and to solve the second problem area, a special filter must be used to remove oversized buildup pigments. Anyway, additional means are required for solving these problems, and there is still another problem in long-term stability of ink even if these means are used.

Addition of salts to the ink has been tried to reduce the specific resistance and also reducing of the viscosity of ink has been also tried to facilitate conversion into fine particles. However, the dispersed pigment particles are liable to be coagulated into coarser particles and to undergo settling or cause clogging of nozzle and filter.

That is, an appropriate white ink composition for ink-jet printing of black or dark articles with a practical satisfaction has not been available yet, including aqueous and organic inks.

SUMMARY OF THE INVENTION

An object of the present invention is to provide a white ink composition for ink-jet printing of dark or black articles with good viscosity, specific resistance, stability in dispersion of pigment particles and clear print.

Another object of the present invention is to use the said white ink composition in ink-jet printing of dark or black articles.

These objects can be attained by a white ink composition for ink-jet printing comprising at least a coloring material, a solvent and a binder resin, where the coloring material is a white pigment having particle sizes of less than 3 μm. It is essential that the white pigment for use in the present white ink composition has particle sizes of less than 3 μm, preferably 0.5–0.7 μm when measured according to particle size distribution by Coulter counter model TAII made by Coulter Electronics, Inc. USA, in view of the dispersion stability, redispersibility, print stability, and nozzle clogging prevention.

The white pigment for use in the present invention includes titanium oxide, zinc white, lithopon, lead white, zinc sulfide, white basic lead sulfate, zirconium oxide, antimony white, and tin oxide, which can be used alone or in their mixture. Particularly, it has been found that titanium white has a high hiding power and undergoes no coagulation in the step of ink drying after ink-jet printing.

The color index number and optimum content of the respective white pigments for use in the present white ink composition are shown in Table 1.

TABLE 1

| White pigment | Chemical formula | Color index | Optimum content (wt. %) |
| --- | --- | --- | --- |
| Titanium oxide (rutile type) | $TiO_2$ | 77891 | 5–40 |
| Titanium oxide (anatase type) | $TiO_2$ | 77891 | 4.5–37.5 |
| Zinc white | ZnO | 77947 | 7–40 |
| Lithopon | $ZnS + BaSO_4$ | 77115 | 5–40 |
| Lead white | $2PbCO_3.Pb(OH)_2$ | 77597 | 5–35 |
| Zinc sulfide | ZnS | 77975 | 5–38 |
| White basic lead sulfate | $2PbSO_4.PbO$ | 75633 | 10–40 |
| Zirconium oxide | $ZrO_2$ | 77052 | 8–40 |
| Antimony white | $Sb_2O_3$ | — | 10–38 |
| Tin oxide | $SnO_2$ | — | 15–40 |

Prints with thoroughly readable concentration can be obtained even at the lower limit content of the white pigment shown in Table 1 in the present white ink composition. However, to completely hide the color of print articles, for example, with titanium oxide, at least about 15% by weight is required. Above the upper limit content of the white pigment shown in Table 1, it has been found that the viscosity of ink compositon is suddenly increased, and exceeds 15 cp, even if various combinations with the binder resin and the organic solvent have been tried. This is because an interaction is increased between the white pigment particles themselves, and the hiding effect of white pigment particles is lost by the binder resin or the organic solvent.

In the present invention, the action of binder resin is to give the ink composition a stable viscosity (1–15 cp), enclose the white pigments, thereby giving electric charges to the white pigment particles to prevent coagulation of the pigment particles and to prevent settling through the Brownian movement, give a strong adhesion of the pigment particles on a print article after printing and constantly maintain a uniform print quality over a predetermined area.

Binder resin particularly suitable for the present white pigment includes rosin-modified maleic acid resin, xylene resin, rosin-modified xylene resin, ester gum, ketone resin, nitrocellulose, novolak-type and resole-type phenol resins, rosin-modified phenol resin, alkylphenol resin, terpene-modified phenol resin, glycerine ester of rosin, polyethyleneglycol ester of rosin, hydrogenated rosin and its ester, various acrylic resins including resins of acrylic acid, methacrylic acid and their alkyl esters, etc. The binder resin can be used in an amount of 0.1 to 5 parts by weight per part of the white pigment. Particularly, 0.3–1.0 part by weight is particularly effective for the viscosity and coagulation prevention of white pigment.

The organic solvent for use in the present invention includes alcohols, for example, methanol, ethanol, 2-propanol, 1-propanol, and butanol, which can govern the drying speed of ink after printing, and can control the surface tension and viscosity of ink and the solubility etc. of a specific resistance-controlling agent and also the stability of white pigments; ketones such as methylethylketone, methylisobutylketone, etc., and ethers such as ethyleneglycolmonomethyl ether, ethyleneglycolmonoethyl ether, ethyleneglycoldiethyl ether, etc., which can have an effect of intensifying the adhesion of the resin on a print article, and a particular effect of maintaining printing dots within a uniform range of predetermined radius without scattering ink droplets at the printing or without scattering the ink at the hitting of print article, and also can promote an action to cover intersurfaces between the binder resin and the white pigment or to help the binder resin to cover the white pigment, thereby increasing the stability in dispersion of white pigment particles; acetate esters such as ethyl acetate, butyl acetate, etc., which can have a particular effect upon the stability in dispersion of white pigments.

The organic solvent can be used in an amount of 55–90% by weight on the basis of the ink composition in view of the desired viscosity of ink, and 2–10% by weight of the acetate ester can be used, when used in combination of other organic solvents, in total of said range of 55–90% by weight.

In the present invention, a specific resistance-controlling agent can be used to adjust the specific resistance of the white ink composition to less than 2000 $\Omega$.cm, and includes, for example, chlorides of sodium, potassium, and ammonium, and other alkali halides, and thiocyanates and nitrates of alkali metals, alkaline earth metals and ammonium. These salts can have a possibility to coagulate the dispersed pigment particles into coarser particles, as described above, and, above all, lithium nitrate and sodium throcyanate are distinguished since these two salts have no adverse effect upon the dispersibility of white pigment, that is, have a dispersion stability of white pigment about 10–20 times as high as that by lithium chloride, solium chloride, potassium nitrate, etc.

The specific resistance-controlling agent can be contained in the present ink composition in an amount of 0.25 to 5% by weight on the basis of the ink composition to satisfy the said requirement for the specific resistance. The amount above 5% by weight has no further advantage.

The present white ink composition can include a surfactant. The surfactant can control the surface tension of the ink composition and can produce a very distinguished print quality by controlling the surface tension of ink to be equal or lower than that of a solid phase of print article. The surfactant can include metallic soaps such as lead, zinc, barium, zirconium, cobalt salts, etc. of naphthenic acid, stearic acid, octenic acid, etc. soluble in the said organic solvent; fluorine-based surfactants, silicone-based surfactants, polyoxyalkylene derivatives, sorbitan alkyl esters, polyoxysorbitan alkyl esters, etc., and can be used in the present white ink composition in an amount of 0.01–5% by weight on the basis of the ink composition.

The present white ink composition can be applied to ink-jet printing by the ordinary ink jet printer at an injection pressure of about 5 atm and the ordinary use temperature of about 5° to about 40° C., whereby clear white prints can be obtained on dark, black or transparent print articles of various materials. The present white ink composition can be applied to various print articles including steel plate, rust proof-treated steel plate, steel plate with an oxidized film by chemical treatment, steel plate with an $Fe_3O_4$ film by high temperature oxidation, steel plate with a coating of thermosetting or thermoplastic resin on the surface, steel pipes or shaped steel articles with the said film or coating, castings; plates, pipes and shaped articles with aluminum surfaces, or other various metal products; thermoplastic and thermo-setting resin products colored in black or similar color by an intensifying agent; rubber products, oxidation polymerization type resin products, car tires, electronic parts molded from black or dark resin; transparent plastic containers, glass sheets and containers; vases; injection cylinders, color TV picture tubes, fluorescent lamp tubes, beer bottles, porcelain products, ceramic products, but the present invention is not limited to the above-mentioned print articles.

The present invention will be discribed in detail below, referring to the accompanying drawings, examples and comparative examples.

PREFERRED EMBODIMENTS OF THE INVENTION

EXAMPLE 1

Figure 1:
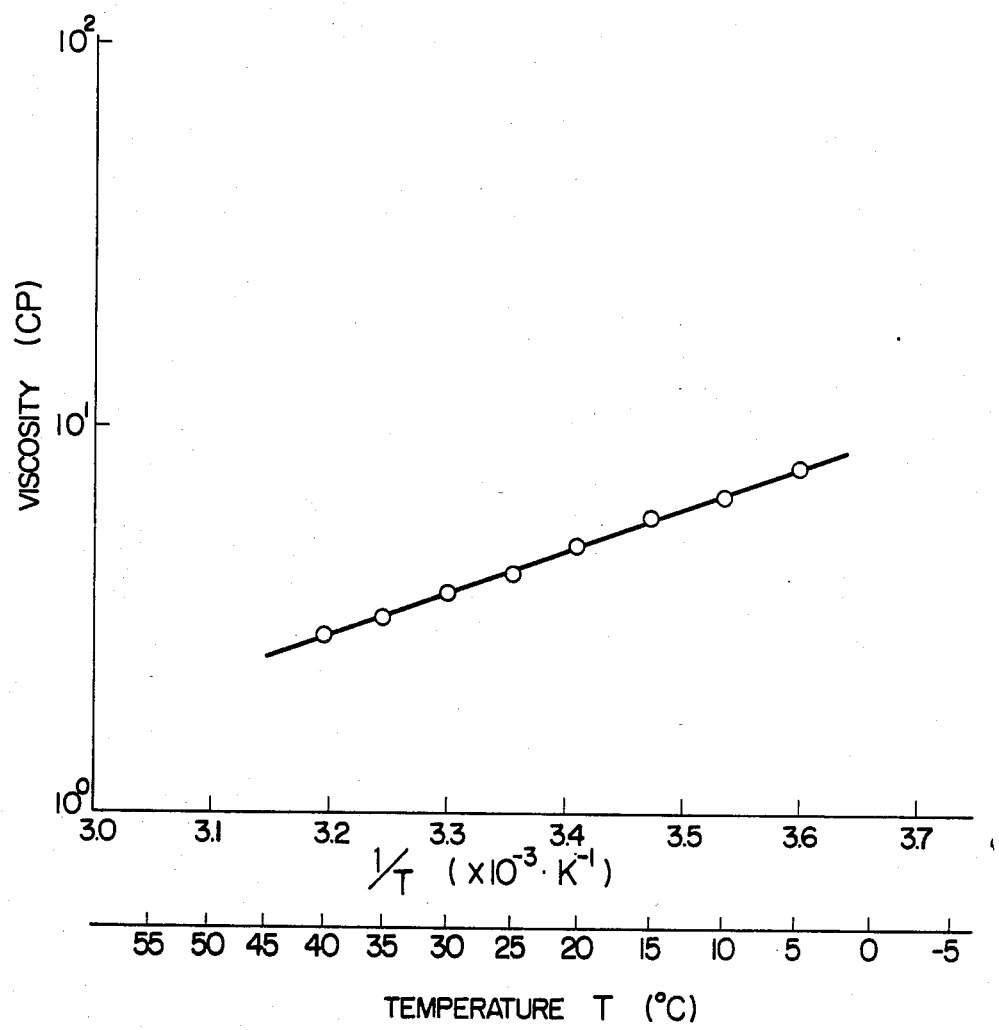
FIG. 1 is a diagram showing a relationship between the temperature and viscosity of a white ink composition according to the present invention.
Figure 2:
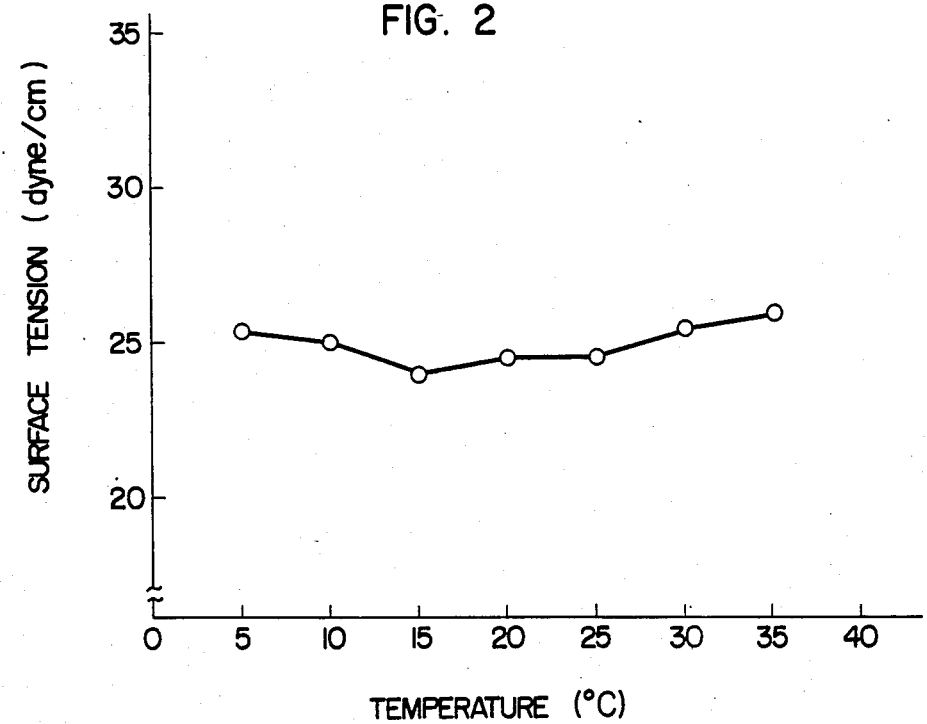
FIG. 2 is a diagram showing a relationship between the temperature and surface tension of a white ink composition according to the present invention.
Figure 3:
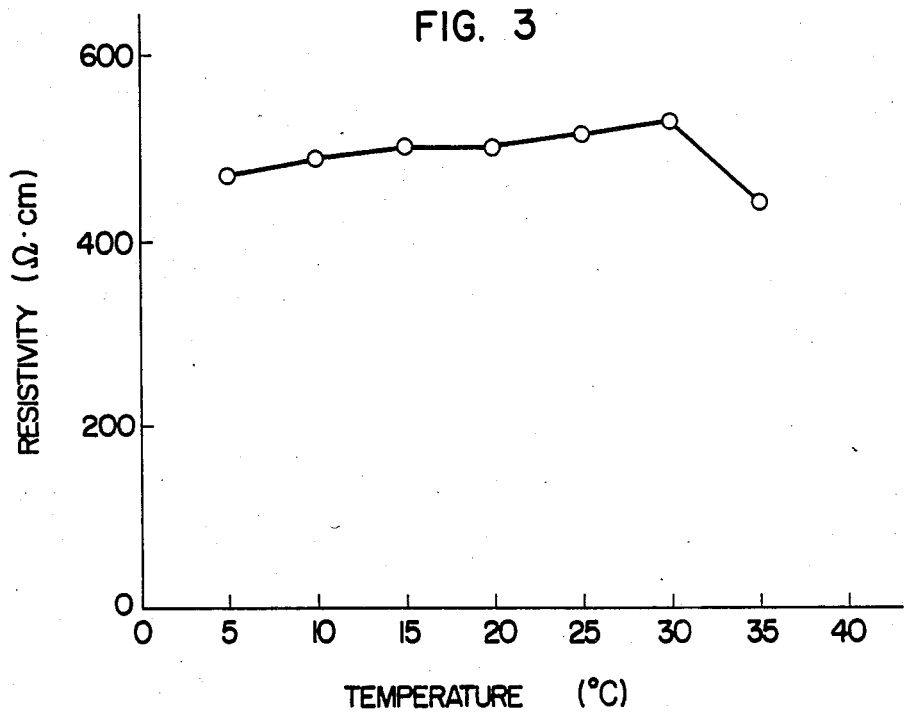
FIG. 3 is a diagram showing a relationship between the temperaure and specific resistance of a white ink composition according to the present invention.

15 parts by weight of titanium oxide powder having a mean particle size of 0.4 μm, rutile type (A-220 made by Ishihara Sangyo K.K., Japan, an equivalent to type 0-310 made by ACC, USA) and a solution of 15 parts by weight of xylene resin (Nikanol H made by Mitsubishi Gas-Chemical Co., Inc., Japan) in 70 parts by weight of cyclohexanone were mixed by a paint shaker (made by Toyo Seiki K.K., Japan) for one hour to obtain a dispersion. Then, 1.5 parts by weight of sodium thiocyanate and 100 parts of methylethyl ketone were added thereto, and the mixture was stirred in a ball mill for 30 minutes. Then, the mixture was filtered by a 3-μm mesh filter under suction to remove coarse particles. Then, 50 parts by weight of methylethylketone containing 0.5 parts by weight of zinc octenate was added thereto, and the mixture was mixed by shaking, whereby an ink applicable to ink-jet printing was obtained. The ink had temperature-viscosity characteristics shown in FIG. 1, temperature-surface tension characteristic shown in FIG. 2, temperaturespecific resistance characteristics shown in FIG. 3, a specific gravity of 1.05 at 20° C., and a mean particle size of 0.4 μm and a particle size distribution identified as A in the following Table 2.

Then, the ink composition was injected and printed onto glass, black plastics, steel plates with high temperature oxidation films and ordinary steel plates and pipes by an ordinary ink jet printer having nozzle orifice diameters of 75 μm under an injection pressure of 4.5 kg/cm$^2$ with vibrations of 118 kHz to produce letter prints of 28 dots wide and 28 dots long. In any of these cases, drying was completed by leaving the ink prints standing for 80–120 seconds, and good prints could be obtained. The prints were neither peeled away by finger rubbing nor sticked to fingers. In the case of glass (ordinary soda glass for panes with one frosted side), print ink dot diameter on the smooth side was 95 μm, whereas that on the frosted side was 160 μm. In any case, the print had a thorough white hiding power, and the prints were clearly readable. In the case of the black plastics, for example, shaped plated of polycarbonate resin containing 7% by weight of carbon powders, shaped plates of acrylonitrile-butadiene-styrene (ABS) resin containing 12% by weight of carbon powders, print ink dots had diameters of 220 μm and 240 μm, respectively, with good clear white prints. Good clear white prints were also obtained in the case of the steel plates and also cold rolled steel plates (JIS G-3141), carbon steel plates (AlSI 1080), normally finished steel plates (JIS G-3304), general steel pipes (JIS G-3421) and chemical steel pipes (JIS G3-3426).

EXAMPLE 2

Titanium oxide powder (same as used in Example 1): 15 parts by weight
Rosin-modified xylene resin (Nikanol R-11, made by Mitsubishi Gas-Chemical Co., Inc.): 40 parts by weight
Cyclohexanol: 60 parts by weight
Ethanol: 20 parts by weight The foregoing components were mixed twice in a sand mill to obtain a dispersion, and then 50 parts by weight of ethanol and 2.0 parts by weight of sodium thiocyanate were added to the dispersion. The dispersion was stirred in a ball mill for 30 minutes, and then filtered through a 3 μm-mech filter under suction to remove coarse particles. Then, 40 parts by weight of methylethylketone containing 0.5 parts by weight of zinc octenate was added thereto, and the mixture was stirred by shaking, whereby an ink suitable for ink-jet printing was obtained. The ink had a viscosity of 8.3 cp (20° C.), a surface tension of 43 dyn/cm (20° C.), a specific resistance of 500 Ω.cm (20° C.), a specific gravity of 1.1 (20° C.), and a mean particle size of 0.4 μm and a particle size distribution identified by C in Table 2. Good prints could be obtained from the ink on the same articles in the same manner as used in Example 1.

EXAMPLE 3

Titanium oxide powder (same as used in Example 1): 13 parts by weight
Rosin-modified maleic acid (Hitalac 20G, made by Hitachi Chemical Co., Ltd.): 4.0 parts by weight
Nitrocellulose (L1/4, made by Daicell Co., Japan): 2.0 parts by weight
Cyclohexanone: 20 parts by weight
Ethanol: 42 parts by weight
Ethyl acetate: 5 parts by weight
Methanol: 5 parts by weight The foregoing components were mixed twice in a sand mill to obtain a dispersion, and then 2 parts by weight of ammonium thiocyanate and 100 parts by weight of ethanol were added thereto and thoroughly mixed. Then, the mixture was filtered through a 3 μm-mesh filter under suction to remove coarse particles. Then, 40 parts by weight of ethanol containing 0.5 parts by weight of zinc octenate was added, and the mixture was mixed by shaking, whereby an ink suitable for ink-jet printing was obtained. The ink had a viscosity of 2.1 cp (20° C.), a surface tension of 23 dyn/cm (20° C.), a specific resistance of 1050 Ω.cm (20° C.), a specific gravity of 1.04 (20° C.), a mean particle size of 0.4 μm and a particle size distribution identified by D in Table 2.

Good prints could be obtained from the ink on the same articles in the same manner as used in Example 1.

EXAMPLE 4

Titanium oxide powder (same as used in Example 1): 11 parts by weight
Ester gum (heat polymerization product of rosin and glycerin having a solftening point of 80°–88° C., made by Arakawa Rinsan Kogyo K.K. Japan): 4.3 parts by weight
Cyclohexanol: 43 parts by weight
Ethanol: 40 parts by weight
Ammonium thiocyanate: 1.5 parts by weight The foregoing components were mixed in a ball mill for 15 hours to obtain a dispersion, and 100 parts by weight of methylethylketone was added thereto. Then, the mixture was thoroughly stirred and filtered through a 3 μm-mesh filter under suction to remove coarse particles, whereby an ink suitable for ink-jet printing was obtained. The ink had a viscosity of 1.8 cp (20° C.), a surface tension of 35 dyn/cm (20° C.), a specific resistance of 800 Ω.cm (20° C.), a specific gravity of 1.11 (20° C.), a mean particle size of 0.4 μm, and a particle size distribution identified by F in Table 2.

Good prints were obtained from the ink in the same manner on the same articles as used in Example 1.

EXAMPLE 5

Titanium oxide powder (same as used in Example 1): 20 parts by weight
Ketone resin (Hilac 222, made by Hitachi Chemical co., Japan): 20 parts by weight
Methylethylketone: 50 parts by weight
Ethanol: 10 parts by weight
Sodium thiocyanate: 2 parts by weight The foregoing components were mixed by a paint shaker (made by Toyo Seiki K.K., Japan) for 2 hours to obtain a dispersion. Then, 100 parts by weight of methylethylketone was added thereto, and the mixture was thoroughly stirred and filtered through a 3 μm-mesh filter to remove coarse particles, whereby an ink suitable for ink-jet priting was obtained. The ink had a viscosity of 9.8 cp (20° C.), a surface tension of 51 dyn/cm (20° C.), a specific resistance of 430 Ω.cm (20° C.), a specific gravity of 1.21 (20° C.), a means particle size of 0.4 μm and a particle size distribution identified as E in Table 2. Good prints were obtained from the ink on the same articles in the same manner as used in Example 1.

EXAMPLE 6

Titanium oxide powder (same as used in Example 1): 40 parts by weight
Rosin-modified maleic acid (same as used in Example 3): 15 parts by weight
Methanol: 10 parts by weight
Ethanol: 12 parts by weight
Isopropanol: 20 parts by weight
Ethyl acetate: 5 parts by weight The foregoing components were mixed by a paint shaker (made by Toyo Seiki K.K., Japan) for two hours to obtain a dispersion. Then, 100 parts by weight of ethanol and 2 parts by weight of lithium nitrate were added thereto. The mixture was thoroughly stirred and filtered through a 3 μm-mesh filter under suction to remove coarse particles, whereby an ink suitable for ink-jet printing was obtained. The ink had a viscosity of 13.5 cp (20° C.), a surface tension of 27.5 dyn/cm (20° C.), a specific resistance of 910 Ω.cm (20° C.), a specific gravity of 1.5 (20° C.), a mean particle size of 0.4 μm, and a particle distribution identified by B in Table 2. Good prints were obtained from the ink on the same articles in the same manner as in Example 1.

EXAMPLE 7

Titanium oxide powder, anatase type (made by Wako Pure Chemical Co., Ltd., Japan): 20 parts by weight
Rosin-modified maleic acid (same as used in Example 3): 4 parts by weight
Nitrocellulose (same as used in Example 3): 3 parts by weight
Cyclohexanone: 25 parts by weight
Ethanol: 35 parts by weight
Ethyl acetate: 1.2 parts by weight
Methanol: 3 parts by weight
Lithium nitrate: 2 parts by weight The foregoing components were thoroughly stirred and the mixture was filtered through a 3 μm-mesh filter under suction to remove coarse particles, whereby an ink having a viscosity of 8.5 cp (20° C.), a surface tension of 35 dyn/cm (20° C.), a specific gravity of 700 Ω.cm (20° C.), a specific gravity of 1.15 (20° C.), and a mean particle size of 0.5 μm was obtained.

EXAMPLE 8

Zinc white (ZnO made by Wako Pure Chemical Co., Ltd. Japan): 18 parts by weight
Ketone resin (same as used in Example 5): 10 parts by weight
Nitrocellulose (same as used in Example 3): 5 parts by weight
Cyclohexanone: 30 parts by weight
Isopropyl alcohol: 35 parts by weight
Ethyl acetae: 1.5 parts by weight
Methanol: 25 parts by weight
Sodium thiocyanate: 2 parts by weight The foregoing componnets were thoroughly stirred, and the mixture was filtered through a 3 μm-mesh filter under suction to remove coarse particles, whereby an ink having a viscosity of 7.8 cp (20° C.), a surface tension of 30 dyn/cm (20° C.), a specific resistance of 550 Ω.cm (20° C.), a specific gravity of 1.10 (20° C.), and a mean particle size of 0.8 μm was obtained.

EXAMPLE 9

Lithopon (ZnS+BaSo4, prepared by the inventors themselves): 28 parts by weight
Rosin-modified xylene resin (same as used in Example 2): 10 parts by weight
Nitrocellulose (same as used in Example 3): 5.5 parts by weight
Cyclohexanone: 40 parts by weight
Ethanol: 25.1 part by weight
Ethyl acetate: 1.8 parts by weight
Methylethylketone: 30 parts by weight
Lithium nitrate: 2.5 parts by weight The foregoing components were thoroughly stirred, and the mixture was filtered through a 3 μm-mesh filter under suction to remove coarse particles, whereby an ink having a viscosity of 6.8 cp (20° C.), a surface tension of 29 dyn/cm (20° C.), a specific resistance of 1050 Ω.cm (20° C.), a specific gravity of 1.18 (20° C.), and a mean particle size of 0.4 μm was obtained.

Example 10

Lead white (2PbCO$_3$.Pb(OH)$_2$, made by Wako Pure Chemical Co., Ltd, Japan): 20 parts by weight
Xylene resin (same as used in Example 1): 13 parts by weight
Nitrocellulose (same as used in Example 3): 3.5 parts by weight
Cyclohexanone 30 parts by weight
Isopropyl alcohol: 38 parts by weight
Ethyl acetate: 1.5 parts by weight
Methanol: 5 parts by weight
Sodium thiocyanate: 2.8 parts by weight The foregoing componenets were thoroughly mixed through a 3 μm-mesh filter under suction to remove coarse particles, whereby an ink having a viscosity of 7.8 cp (20° C.), a surface tension of 29 dyn/cm (20° C.), a specific resistance of 48 Ω.cm (20° C.), a specific gravity of 1.18 (20° C.), and a mean particle size of 0.5 μm was obtained.

Example 11

Zinc sulfide (ZnS, made by Wako Pure Chemical Co., Ltd., Japan): 23 parts by weight
Ketone resin (same as used in Example 5): 20 parts by weight
Nitrocellulose (same as used in Example 3): 3 parts by weight
Cyclohexanone: 55 parts by weight
Ethanol: 30 parts by weight
Ethyl acetate; 3.5 parts by weight
Ethyleneglycol monoethyl ether: 15 parts by weight
Lithium nitrate: 4.5 parts by weight The foregoing components were thoroughly stirred, and the mixture was filtered through a 3 μm-mesh filter under suction to remove coarse particles, whereby an ink having a viscosity of 9.8 cp (20° C.), a surface tension of 32 dyn/cm (20° C.), a specific resistance of 650 Ω.cm (20° C.), a specific gravity of 1.18 (20° C.), and a mean particle size of 0.6 μm was obtained.

Example 12

White basic lead sulfate (2PbSO$_4$.PbO, made by Wako Pure Chemical Co., Ltd., Japan): 15 parts by weight
Rosin-modified maleic acid (same as used in Example 3): 5 parts by weight
Nitrocellulose (same as used in Example 3): 3 parts by weight
Cyclohexanone: 35 parts by weight
Ethanol: 28 parts by weight
Ethyl acetate: 1.5 parts by weight
Methanol: 5 parts by weight
Sodium thiocyanate: 2.1 parts by weight The foregoing components were thoroughly stirred, and the mixture was filtered through a 3 μm-mesh filter under suction to remove coarse particles, whereby an ink having a viscosity of 8.6 cp (20° C.), a surface tension of 30 dyn/cm (20° C.), a specific resistance of 550 Ω.cm (20° C.), a specific gravity of 1.18 (20° C.), and a mean particle size of 0.45 μm was obtained.

Example 13

Zirconium oxide (ZrO$_2$, made by Wako Pure Chemical Co., Ltd., Japan): 12 parts by weight
Rosin-modified maleic acid (same as used in Example 3): 5 parts by weight
Nitrocellulose (same as used in Example 3): 2.1 parts by weight
Cyclohexanone: 35 parts by weight
Ethanol: 25 parts by weight
Ethyl acetate; 3 parts by weight
Isopropyl alcohol: 30 parts by weight
Lithium nitrate: 3 parts by weight The foregoing components were thoroughly stirred, and the mixture was filtered through a 3 μm-mesh filter under suction to remove coarse particles, whereby an ink having a viscosity of 5.8 cp (20° C.), a surface tension of 28 dyn/cm (20° C.), a specific resistance of 480 Ω.cm (20° C.), a specific gravity of 1.09 (20° C.), and a mean particle size of 0.75 μm was obtained.

Example 14

Antimony white (Sb$_2$O$_3$, made by Wako Pure Chemical Co., Ltd., Japan): 15 parts by weight
Keton resin (same as used in Example 5): 10 parts by weight
Nitrocellulose (same as used in Example 3): 5 parts by weight
Cyclohexanone: 40 parts by weight
Ethyleneglycol monomethyl ether: 25 parts by weight
Ethyl acetate: 2.5 parts by weight
Methanol: 3.1 parts by weight
Sodium thiocyanate: 2.5 parts by weight The foregoing components were thoroughly stirred, and the mixture was filtered through a 3 μm-mesh filter under suction to remove coarse particles, whereby an ink having a viscosity of 6.5 cp (20° C.), a surface tension of 29 dyn/cm (20° C.), a specific resistance of 650 Ω.cm (20° C.), a specific gravity of 1.10 (20° C.), and a mean particle size of 0.7 μm was obtained.

Example 15

Tin oxide (SnO$_2$, made by Wako Pure Chemical Co., Ltd., Japan): 25 parts by weight
Ester gum (same as used in Example 4): 13 parts by weight
Nitrocellulose (same as used in Example 3): 2 parts by weight
Cyclohexanone: 40 parts by weight
Ethanol: 25 parts by weight
Ethyl acetate: 3 parts by weight
Isoopropyl alcohol: 10 parts by weight
Lithium nitrate: 2.8 parts by weight The foregoing components were thoroughly stirred, and the mixture was filtered through a 3 μm-mesh filter under suction, whereby an ink having a viscosity of 8.5 cp (20° C.), a surface tension of 32 dyn/cm (20° C.), a specific resistance of 750 Ω.cm (20° C.), a specific gravity of 1.20 (20° C.), and a mean particle size of 0.8 μm was obtained.

From the inks obtained in Examples 7 to 15, good prints were obtained on the same articles in the same manner as in Example 1.

Comparative Example 1

Titanium oxide power (same as used in Example 1): 21 parts by weight
Rosin-modified maleic acid (same as used in Example 3): 3.5 parts by weight
Nitrocellullose (same as used in Example 3): 3.5 parts by weight
Cyclohexanone: 20 parts by weight
Ethanol: 35 parts by weight
Ethyl acetate; 1.5 parts by weight
Isopropyl alcohol: 25 parts by weight
Sodium thiocyanate: 2.5 parts by weight The foregoing components were thoroughly stirred, and the mixture was filtered through a 4 μm-mesh filter under suction to remove coarse particles, whereby an ink having a viscosity of 8.0 cp (20° C.), a surface tension of 29 dyn/cm (20° C.), a specific resistance of 850 Ω.cm (20° C.), a specific gravity of 1.08, and a mean particle size and particle size distribution identified as G in Table 2 was obtained.

Comparative Example 2

Titanium oxide powder (same as used in Example 1): 20 parts by weight
Xylene resin (same as used in Example 1): 4.8 parts by weight
Nitrocellulose (same as used in Example 3): 3 parts by weight
Cyclohexanone: 23 parts by weight
Isopropyl alcohol: 41 parts by weight
Ethyl acetate; 1.8 parts by weight
Methanol: 3.1 parts by weight
Sodium thiocyanate: 3.2 parts by weight The foregoing components were thoroughly stirred and the mixture was filtered through a 4 μm-mesh filter under suction to remove coarse particles, whereby an ink having viscosity of 8.8 cp (20° C.), a surface tension of 27 dyn/cm (20° C.), a specific resistance of 780 Ω.cm (20° C.), a specific gravity of 1.12 (20° C.), and a mean particle size and particle size distribution identified as H in Table 2 was obtained.

Comparative Example 3

Titanium oxide powder (same as used in Example 1): 28 parts by weight
Rosin-modified maleic acid (same as used in Example 3): 4.5 parts by weight
Nitrocellulose (same as used in Example 3): 4.5 parts by weight
Cyclohexanone: 28 parts by weight
Ethanol: 45 parts by weight
Ethyl acetate: 2.5 parts by weight
Isopropyl alcohol: 30 parts by weight
Lithium nitrate: 3 parts by weight The foregoing components were thoroughly stirred, and the mixture was filtered through a 5 μm-mesh filter under suction to remove coarse particles, whereby an ink having a viscosity of 7.9 cp (20° C.), a surface tension of 33 dyn/cm (20° C.), a specific resistance of 980 Ω.cm (20° C.), a specific gravity of 1.12 (20° C.), and a mean particle size and particle size distribution identified as I in Table 2 was obtained.

The inks obtained in Comparative Examples 1 to 3 were jet printed onto the same articles in the same manner as in Example 1, and it was found that no good print stability was obtained and the prints had dot failures, and furthermore that nozzle clogging was liable to take place.

Figure 4:
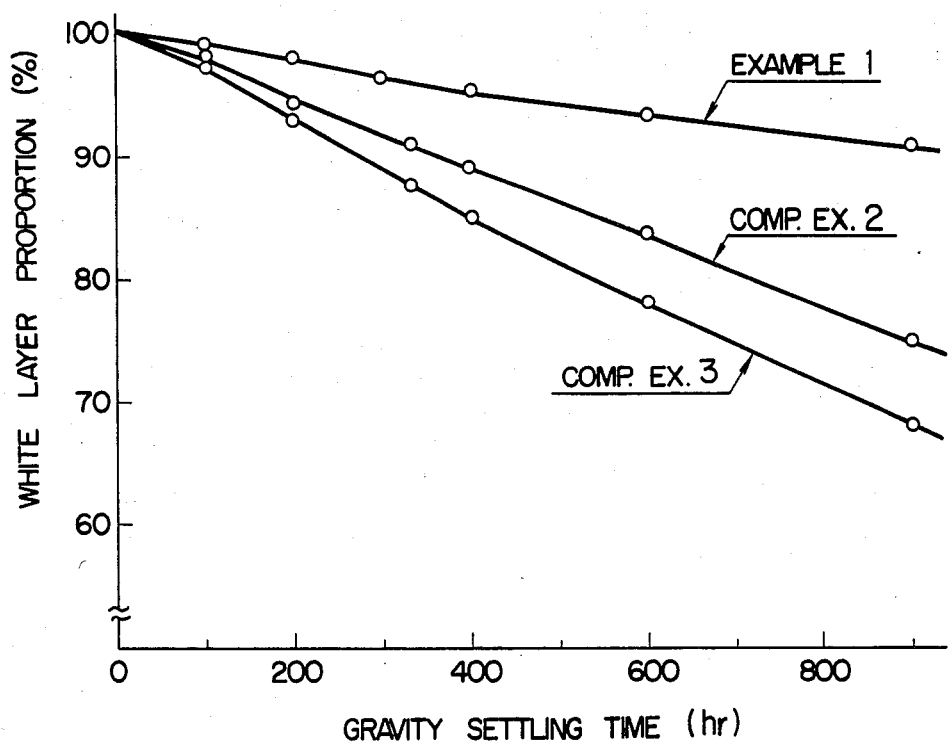
FIG. 4 is a diagram showing changes with time in white layer proportion of white ink compositions on the bais of particle size distribution of titanium oxide as white color pigment.
Figure 5:
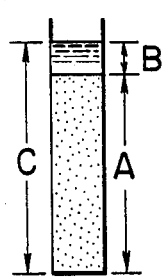
FIG. 5 is a schematic view showing determination of changes with time in white layer proportion shown in FIG. 4.

Furthermore, it was found that no good dispersion stability was obtained, as shown in FIG. 4, where white layer proportion (%) of inks prepared in Comparative Examples 2 and 3 are shown against gravity settling time in comparison with the ink prepared in Example 1. The white layer proportion (%) was determined as shown in FIG. 5 by filling a well-stirred sample of ink in a glass cylinder, 18 mm in diameter and 150 mm high, up to a height of 130 mm, and leaving the ink for gravity settling, and a proportion of a settled white layer section shown by A in FIG. 5 to the total height C as given by formula A/C×100 (%), was plotted againt time (hr), as shown in FIG. 4. In FIG. 5, A is a settled white layer section, B is a supernatant clear layer section, and C is a total height of the filled ink.

The mean particle size and particle distribution of titanium oxide in the inks prepared in Examples 1 to 6 and Comparative Examples 1 to 3 are shown in Table 2, and influences of ink properties by particle size of titanium oxide in the inks prepared in Examples 1 to 6 and Comparative Examples 1 to 3 are shown in Table 3.

TABLE 2

| | Mean particle size and particle size distribution of titanium oxide in inks | | | | | |
|---|---|---|---|---|---|---|
| | Particle size distribution (wt. %) | | | | | Mean particle size (μm) |
| | >4 μm | 4-3 μm | 3-1 μm | 1-0.2 μm | 0.2 m> | |
| A (= Ex. 1) | 0 | 0 | 6.2 | 76.9 | 16.9 | 0.4 |
| B (= Ex. 6) | 0 | 0 | 8.2 | 75.0 | 13.2 | 0.4 |
| C (= Ex. 2) | 0 | 0 | 4.6 | 80.7 | 14.7 | 0.4 |
| D (= Ex. 3) | 0 | 0 | 7.0 | 80.5 | 12.5 | 0.4 |
| E (= Ex. 5) | 0 | 0 | 7.3 | 72.6 | 20.0 | 0.4 |
| F (= Ex. 4) | 0 | 0 | 3.8 | 80.0 | 16.2 | 0.4 |
| G (= Comp. Ex. 1) | 0 | 3.1 | 10.5 | 71.2 | 15.2 | 0.42 |
| H (= Comp. Ex. 2) | 0 | 7.5 | 15.4 | 68.1 | 10.0 | 0.46 |
| I (= Comp. Ex. 3) | 4.5 | 5.6 | 13.5 | 70.8 | 5.6 | 0.54 |

TABLE 3

| | Influences of ink properties by particle size distribution or particle size of titanium oxide in ink | | | |
|---|---|---|---|---|
| | Dispersion stability | Redispersion-ability | Print stability | Nozzle clogging |
| A | good | good | good | none |
| B | good | good | good | none |
| C | good | good | good | none |
| D | good | good | good | none |
| E | good | good | good | none |
| F | good | good | good | none |
| G | fairly good | good | poor | slightly occurred |
| H | poor | fairly good | poor | slightly occurred |
| I | poor | poor | poor | occurred |

What is claimed is:

1. A white ink composition for ink-jet printing, which consists essentially of 4.5 to 40% by weight of inorganic white pigment having a particle size of less than 3 μm on the basis of the ink composition; a binder resin selected from the group consisting of a rosin-modified maleic acid resin, a xylene resin, a rosin-modified xylene resin, an ester gum, a ketone resin, a nitrocellulose, a novolak phenol resin, a resole phenol resin, a rosin-modified phenol resin, an alkylphenol resin, a terpene-modified phenol resin, a glycerine ester of rosin, a polyethyleneglycol ester of rosin, and a hydrogenated rosin or an ester thereof in an amount of 0.1 to 5 parts by weight per part by weight of the inorganic white pigment; 55 to 90% by weight of a solvent capable of dissolving said binder resin selected from the group consisting of an alcohol, a ketone, an ether, an acetate ester and cyclohexanone on the basis of the ink composition; and 0.25 to 5% by weight of a specific resistance-controlling agent capable of adjusting the specific resistance of the composition to less than 2,000 $\Omega$.cm on the basis of the ink composition, said specific resistance-controlling agent being selected from the group consisting of an alkali metal halide; an ammonium halide; a thiocyanate of an alkali metal, an alkaline earth metal or ammonium; and a nitrate of an alkali metal, an alkaline earth metal or ammonium.

2. A white ink composition according to claim 1 wherein the white pigment is at least one of titanium oxide, zinc white, lithopon, lead white, zinc sulfate, white basic lead sulfate, zirconium oxide, antimony white, and lead oxide.

3. A white ink composition according to claim 1, wherein the white pigment is titanium oxide and is contained in an amount of 5–40% by weight as rutile type and 4.5–37.5% by weight as anatase type on the basis of the ink composition.

4. A white ink composition according to claim 1, wherein the white pigment is zinc white and is contained in an amount of 7–40% by weight on the basis of the ink composition.

5. A white ink composition according to claim 1, wherein the white pigment is lithopon and is contained in an amount of 5–40% by weight on the basis of the ink composition.

6. A white ink composition according to claim 1, wherein the white pigment is lead white, and is contained in an amount of 5–35% by weight on the basis of the ink composition.

7. A white ink composition according to claim 1, wherein the white pigment is zinc sulfate and is contained in an amount of 5–38% by weight on the basis of the ink composition.

8. A white ink composition according to claim 1, wherein the white pigment is white basic lead sulfate and is contained in an amount of 10–40% by weight on the basis of the ink composition.

9. A white ink composition according to claim 1, wherein the white pigment is zirconium oxide, and is contained in an amount of 8–40% by weight on the basis of the ink composition.

10. A white ink composition according to claim 1, wherein the white pigment is antimony white, and is contained in an amount of 10–38% by weight on the basis of the ink composition.

11. A white ink composition according to claim 1, wherein the white composition is tin oxide, and is contained in an amount of 15–40% by weight on the basis of the ink composition.

12. A white ink composition for ink-jet printing, which comprises 4.5 to 40% by weight of inorganic white pigment having a particle size of less than 3 $\mu$m on the basis of the ink composition; a binder resin selected from the group consisting of a rosin-modified maleic acid resin, a xylene resin, a rosin-modified xylene resin, an ester gum, a ketone resin, a nitrocellulose, a novolak phenol resin, a resole phenol resin, a rosin modified phenol resin, an alkylphenol resin, a terpene-modified phenol resin, a glycerine ester of rosin, a polyethyleneglycol ester of rosin, and a hydrogenated rosin or an ester thereof in an amount of 0.1 to 5 parts by weight per part by weight of the inorganic white pigment; 55 to 90% by weight of a solvent capable of dissolving said binder resin selected from the group consisting of an alcohol, a ketone, an ether, an acetate ester and cyclohexanone on the basis of the ink composition; and 0.25 to 5% by weight of a specific resistance-controlling agent capable of adjusting the specific resistance of the composition to less than 2,000 $\Omega$.cm on the basis of the ink composition, said specific resistance-controlling agent being selected from the group consisting of an alkali metal halide; an ammonium halide; a thiocyanate of an alkali metal, an alkaline earth metal or ammonium; and a nitrate of an alkali metal, an alkaline earth metal or ammonium; wherein said white ink composition is non-aqueous.

13. A method for ink-jet printing, which comprises injecting a white ink composition which consists essentially of 4.5 to 40% by weight of inorganic white pigment having a particle size of less than 3 $\mu$m on the basis of the ink composition; a binder resin selected from the group consisting of a rosin-modified maleic acid resin, a xylene resin, a rosin-modified xylene resin, an ester gum, a ketone resin, a nitrocellulose, a novolak phenol resin, a resole phenol resin, a rosin modified phenol resin, an alkylphenol resin, a terpene-modified phenol resin, a glycerine ester of rosin, a polyethyleneglycol ester of rosin, and a hydrogenated rosin or an ester thereof in an amount of 0.1 to 5 parts by weight per part by weight of the inorganic white pigment; 55 to 90% by weight of a solvent capable of dissolving said binder resin selected from the group consisting of an alcohol, a ketone, an ether, an acetate ester and cyclohexanone on the basis of the ink composition; and 0.25 to 5% by weight of a specific resistance-controlling agent capable of adjusting the specific resistance of the composition to less than 2,000 $\Omega$.cm on the basis of the ink composition, said specific resistance-controlling agent being selected from the group consisting of an alkali metal halide; an ammonium halide; a thiocyanate of an alkali metal, an alkaline earth metal or ammonium; and a nitrate of an alkali metal, an alkaline earth metal or ammonium, from a nozzle in the form of fine particles, and forming a print of desired pattern on a print article white deflecting the fine particles as desired by deviation electrodes controlled by an electrical signal.

14. A method for ink-jet printing, which comprises injecting a white ink composition comprising 4.5 to 40% by weight of inorganic white pigment having a particle size of less than 3 $\mu$m on the basis of the ink composition; a binder resin selected from the group consisting of a rosin-modified maleic acid resin, a xylene resin, a rosin-modified xylene resin, an ester gum, a ketone resin, a nitrocellulose, a novolak phenol resin, a resole phenol resin, a rosin-modified phenol resin, an alkylphenol resin, a terpene-modified phenol resin, a glycerine ester of rosin, a polyethyleneglycol ester of rosin, and a hydrogenated rosin or an ester thereof in an amount of 0.1 to 5 parts by weight per part by weight of the inorganic white pigment; 55 to 90% by weight of a solvent capable of dissolving said binder resin selected from the group consisting of an alcohol, a ketone, an ether, an acetate ester and cyclohexanone on the basis of the ink composition; and 0.25 to 5% by weight of a specific resistance-controlling agent capable of adjusting the specific resistance of the composition to less than 2,000 $\Omega$.cm on the basis of the ink composition, said specific resistance-controlling agent being selected from the group consisting of an alkali metal halide; an ammonium halide; a thiocyanate of an alkali metal, an alkaline earth metal or ammonium; and a nitrate of an alkali metal, an alkaline earth metal or ammonium, from a nozzle in the form of fine particles, electrically charging the fine particles and forming a print of desired pattern on a print article while deflecting the fine particles as desired by deviation electrodes controlled by an electrical letter signal; wherein said white ink composition is non-aqueous.

15. A method according to claim 13, wherein the white pigment is at least one of titanium oxide, zinc white, lithopon, lead white, zinc sulfate, white basic lead sulfate, zirconium oxide, antimony white, and lead oxide.

16. A white ink composition according to claim 12, wherein the white pigment is at least one of titanium oxide, zinc white, lithopon, lead sulfate, white basic lead sulfate, zirconium oxide, antimony white, and lead oxide.

17. A white ink composition according to claim 12, wherein the white pigment is titanium oxide and is contained in an amount of 5–40% by weight as rutile type and 4.5–37.5% by weight as anatase type on the basis of the ink composition.

18. A white ink composition according to claim 12, wherein the white pigment is zinc white and is contained in an amount of 7–40% by weight on the basis of the ink composition.

19. A white ink composition according to claim 12, wherein the white pigment is lithopon and is contained in an amount of 5–40% by weight on the basis of the ink composition.

20. A white ink composition according to claim 12, wherein the white pigment is lead white, and is contained in an amount of 5–35% by weight on the basis of the ink composition.

21. A white ink composition according to claim 12, wherein the white pigment is zinc sulfate and is contained in an amount of 5–38% by weight on the basis of the ink composition.

22. A white ink composition according to claim 12, wherein the white pigment is white basic lead sulfate and is contained in an amount of 10–40% by weight on the basis of the ink composition.

23. A white ink composition according to claim 12, wherein the white pigment is zirconium oxide, and is contained in an amount of 8–40% by weight on the basis of the ink composition.

24. A white ink composition according to claim 12, wherein the white pigment is antimony white, and is contained in an amount of 10–38% by weight on the basis of the ink composition.

25. A white ink composition according to claim 12, wherein the white composition is tin oxide, and is contained in an amount of 15–40% by weight on the basis of the ink composition.

26. A white ink composition according to claim 12, wherein the solvent is selected from the group consisting of an alcohol, a ketone, ethyl acetate and cyclohexanone.

27. A method according to claim 14, wherein the solvent is selected from the group consisting of an alcohol, a ketone, ethyl acetate and cyclohexanone.

28. A white ink composition according to claim 1, wherein the solvent is selected from the group consisting of an alcohol, a ketone, ethyl acetate and cyclohexanone.

29. A method according to claim 13, wherein the solvent is selected from the group consisting of an alcohol, a ketone, ethyl acetate and cyclohexanone.

30. A white ink composition according to claim 12, wherein said specific resistance-controlling agent is selected from the group consisting of lithium nitrate and sodium thiocyanate.

31. A method according to claim 14, wherein said specific resistance-controlling agent is selected from the group consisting of lithium nitrate and sodium thiocyanate.

32. A white ink composition according to claim 1, wherein said specific resistance-controlling agent is selected from the group consisting of lithium nitrate and sodium thiocyanate.

33. A method according to claim 13, wherein said specific resistance-controlling agent is selected from the group consisting of lithium nitrate and sodium thiocyanate.

* * * * *